United States Patent
Hoegger

(10) Patent No.: US 6,299,219 B1
(45) Date of Patent: Oct. 9, 2001

(54) HYDRAULIC SWIVEL HAVING A LABYRINTH SEAL

(75) Inventor: Bruce A. Hoegger, Hamel, MN (US)

(73) Assignee: Remanco Hydraulics, Inc., Minneapolis, MN (US)

( * ) Notice: Subject to any disclaimer, the term of this patent is extended or adjusted under 35 U.S.C. 154(b) by 0 days.

(21) Appl. No.: 09/253,623

(22) Filed: Feb. 19, 1999

Related U.S. Application Data

(63) Continuation of application No. 08/589,964, filed on Jan. 23, 1996, now abandoned.

(51) Int. Cl.$^7$ ................................................. F16L 22/00
(52) U.S. Cl. .......................... 285/190; 285/276; 285/98
(58) Field of Search .................................. 285/190, 281, 285/347, 276, 918, 98, 321, 910

(56) References Cited

U.S. PATENT DOCUMENTS

| | | | |
|---|---|---|---|
| 738,503 | 9/1903 | Waters | 285/276 X |
| 1,354,710 | 10/1920 | Wise | 285/276 X |
| 2,343,491 | 3/1944 | Bard et al. | 285/97.3 |
| 2,382,375 | 8/1945 | Allen et al. | 285/97.3 |
| 2,384,360 | 9/1945 | Allen et al. | 285/97.3 |
| 2,459,643 | 1/1949 | Hartley | 285/96.3 |
| 2,509,672 | 5/1950 | Christensen | 277/165 |
| 2,595,787 | 5/1952 | Heimann | 285/321 X |
| 2,607,644 | 8/1952 | Smith et al. | 277/165 |
| 2,661,967 | 12/1953 | Mitchell | 285/918 X |
| 2,688,500 | 9/1954 | Scott | 285/910 X |
| 2,789,847 | 4/1957 | Jackson | 277/84 |
| 2,845,282 | 7/1958 | Mueller | 285/23 |
| 2,857,184 | 10/1958 | Mancusi | 285/918 X |
| 2,890,069 | 6/1959 | Larkin et al. | 277/94 |
| 2,943,868 | 7/1960 | Hanback | 285/918 X |
| 2,968,501 | 1/1961 | Tisch | 285/918 X |
| 3,011,803 | 12/1961 | Buckner et al. | 285/23 |
| 3,024,030 | 3/1962 | Kock | 285/190 X |
| 3,243,212 | 3/1966 | May | 285/321 X |
| 3,290,068 * | 12/1966 | Jackson | 285/281 |
| 3,381,970 | 5/1968 | Brown | 277/165 X |
| 3,402,253 | 9/1968 | McCracken | 174/86 |
| 3,454,288 | 7/1969 | Moncusi | 285/98 |
| 3,502,343 | 3/1970 | Pustelink | 277/84 X |
| 3,761,601 | 9/1973 | Kaesser | 285/321 X |
| 3,885,800 | 5/1975 | Sievenpiper | 277/165 |
| 4,113,288 | 9/1978 | Cox | 285/276 X |
| 4,186,946 | 2/1980 | Snow | 285/276 X |
| 4,468,541 | 8/1984 | Yoshimura et al. | 277/165 X |
| 4,478,435 | 10/1984 | Cheshier et al. | 285/39 |
| 4,577,892 | 3/1986 | Wrulich et al. | 285/136 |
| 4,585,256 | 4/1986 | Rassieur et al. | 285/190 |
| 4,672,998 | 6/1987 | Kozak, III | 137/614.04 |
| 4,804,206 | 2/1989 | Wood et al. | 285/276 X |
| 5,040,905 | 8/1991 | Boyd | 277/165 X |
| 5,147,094 | 9/1992 | Rehfeld | 277/165 X |
| 5,169,181 | 12/1992 | Timm et al. | 277/85 |
| 5,419,594 * | 5/1995 | Nelms | 285/321 |

FOREIGN PATENT DOCUMENTS

| | | | |
|---|---|---|---|
| 4211192 | 10/1993 | (DE) | 277/94 |
| 1394337 | 2/1964 | (FR) | 277/201 |
| 134904 | 3/1952 | (SE) | 285/190 |

* cited by examiner

Primary Examiner—Teri Pham Luu
(74) Attorney, Agent, or Firm—Kinney & Lange, P.A.

(57) ABSTRACT

A hydraulic swivel, the hydraulic swivel including a female component that is capable of being placed in fluid connection with a first line, a male component rotatably positioned within the female component and capable of being placed in fluid connection with a second line, the male component having one or more radial surfaces proximate the female component and the female component having one or more radial surfaces proximate the male component, and one or more split rings, at least one split ring located in a radial recess defined by one of the radial surfaces of at least the male component or the female component.

67 Claims, 5 Drawing Sheets

HYDRAULIC SWIVEL HAVING A LABYRINTH SEAL

This application is a continuation of Ser. No. 08/589,964 filed Jan. 23, 1996, now abandoned.

BACKGROUND OF THE INVENTION

The present invention generally relates to swivels for connecting fluid flow lines. More specifically, the present invention relates to hydraulic swivels having multi-component seal structures, such as labyrinth seals.

A hydraulic swivel for rotatably connecting fluid flow lines is a multi-component device with at least two ends that are connectable to fluid flow lines. In practice, hydraulic swivels usually include a female component and a male component that is rotatably inserted within the female component. Hydraulic swivels typically have a mechanism for retaining the male component within the female component, a mechanism for reducing frictional forces arising from the relative rotational movement between the male and female components, and a mechanism for sealing any annular space located between the male and female components to minimize or prevent escape of fluid from the hydraulic swivel. These mechanisms may vary somewhat, depending upon the balanced or unbalanced nature of the hydraulic swivel.

In a balanced hydraulic swivel, fluid flowing between the inlet and outlet of the swivel places substantially the same amount of force upon upstream and downstream swivel components. Thus, the fluid forces are said to be balanced and do not tend to separate the downstream components from the upstream components. In balanced swivels, retaining clips are typically adequate to retain the male component within the female component. Nonetheless, multi-component bearings are usually positioned between the female and male components to reduce frictional resistance. For example, bearing race portions may be included in facing annular surfaces of the male and female components. Bearing members, such as ball bearings, are then positioned within the race formed by adjacent race portions of the male and female components. The bearing members, in cooperation with the bearing race portions, reduce frictional force between the male and female components and facilitate relative rotational movement of the male and female components. Balanced hydraulic swivels are typically sealed to prevent fluid leakage from the swivel by inserting a polymeric o-ring between the male and female components. For example, the o-ring may be positioned in an annular recess formed in the male or female component so that the o-ring is in slidable contact with a surface of the male or female component that faces the annular recess.

In an unbalanced hydraulic swivel, fluid flowing between the inlet and outlet of the swivel places greater forces upon the downstream swivel components than upon the upstream swivel components. The swivel therefore experiences unbalanced fluid forces that tend to separate the male and female components, absent an adequate retaining mechanism. In unbalanced hydraulic swivels, bearing members that are retained in a bearing race are typically used to prevent separation of the male and female components and to minimize frictional forces between the male and female components. As with pressure balanced swivels, the bearing race may be formed by facing annular race portions that are disposed in the male component and the female component. As with pressure balanced swivels, a polymeric o-ring is typically inserted between the male and female components of the swivel to prevent fluid leakage from the unbalanced hydraulic swivel.

Hydraulic swivels often operate in less than optimum conditions where the fluid flowing through the hydraulic swivel may be corrosive or may lack significant lubricating qualities. Corrosive fluids tend to chemically degrade many types of polymeric materials that are used in making many of the available o-rings, When corrosive fluids and/or fluids with poor lubricating qualities by-pass the o-ring seal, the fluid is then free to contact any bearing component of the hydraulic swivel. If the fluid is corrosive, the fluid may cause corrosion or other degradation of the bearing components that increases torque in the swivel and inhibits relative rotational movement between the male and female components. Fluid with little or no lubricating capacity also increases torque in the swivel and inhibits relative rotational movement of the male and female components, when the fluid contacts bearing components of the swivel. Furthermore, the rate at which fluid by-passes the o-ring may be adequate to wash lubricant out of the bearing race and further inhibit relative rotational movement between the male and female components.

There is a need for a new type of seal that adequately protects, or eliminates the need for, bearing mechanisms, such as ball bearings, that are presently used in hydraulic swivels. Additionally, there is a need for a new type of seal that protects bearing mechanisms from contact with corrosive and/or low lubricating capacity fluids that are carried through hydraulic swivels. Also, there is a need for a new type of sealing structure that is capable of operating for extended periods of time without degradation of the sealing qualities of the sealing structure. Finally there is a need for a new type of sealing structure that is capable of operating for extended periods of time while protecting bearing mechanisms from the effects of corrosive and/or low lubricating capacity fluids.

SUMMARY OF THE INVENTION

The present invention provides a hydraulic swivel that includes a female component which is capable of being placed in fluid connection with a first fluid flow line and a male component which is rotatably positioned within the female component and is capable of being placed in fluid connection with a second fluid flow line. The male component has one or more radial surfaces proximate the female component and the female component has one or more radial surfaces proximate the male component. The hydraulic swivel further includes one or more split rings with at least one split ring located in a radial recess defined by one of the radial surfaces of at least the male component or the female component. The present invention further includes a device for rotatably connecting fluid flow conduits and a method of making a device for rotatably connecting fluid flow lines.

DETAILED DESCRIPTION OF THE PREFERRED EMBODIMENTS

The device of the present invention is particularly suited for rotatably connecting two or more fluid flow lines. A multi-component seal structure that is incorporated in the device of the present invention permits extended operation of the device, even when the fluid flowing through the device is corrosive and/or has low lubricating capacity.

Figure 1:
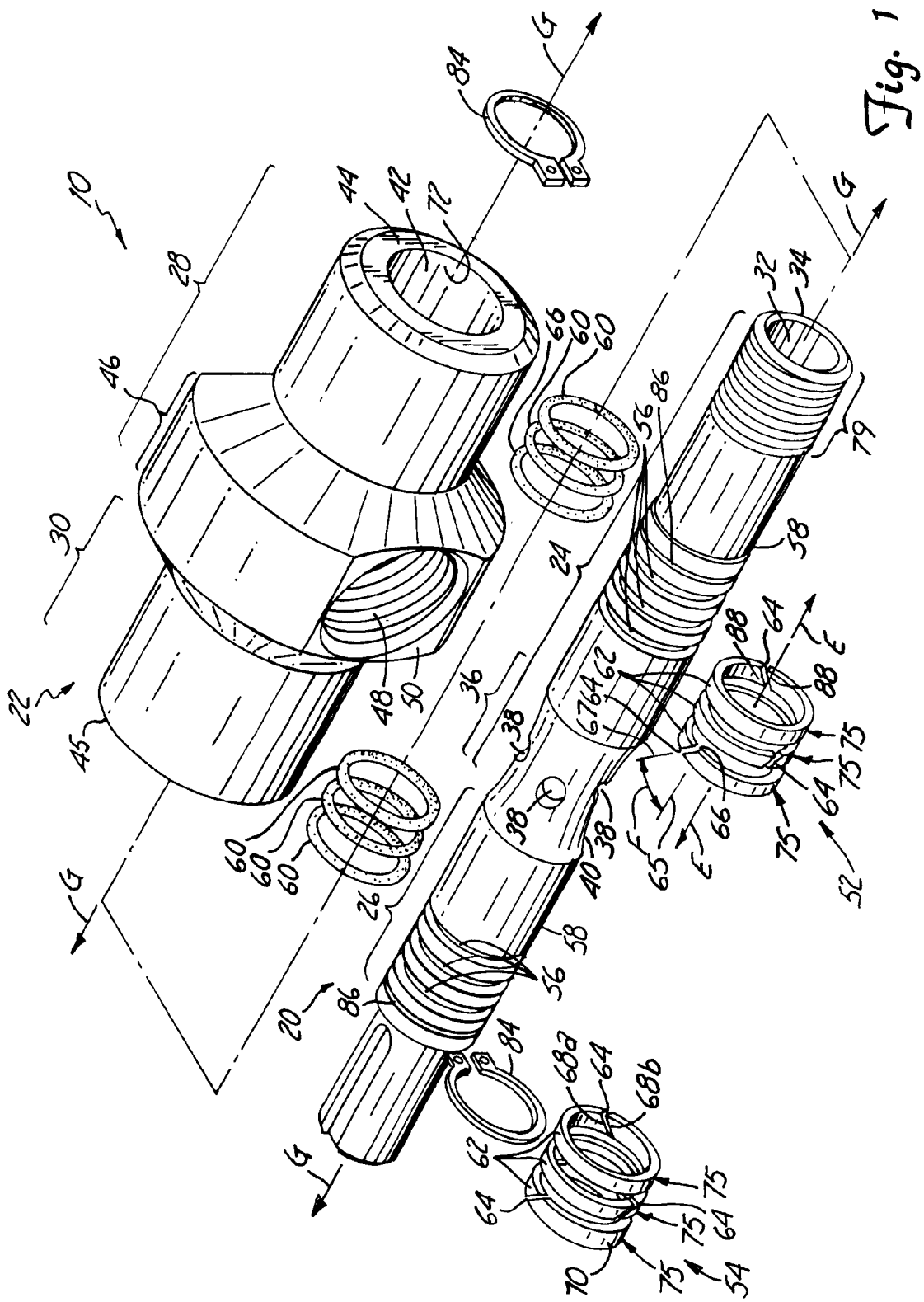
FIG. 1 is an exploded perspective view of the device of the present invention.

Referring to FIG. 1, the device of the present invention, which may take the form of a hydraulic swivel, is generally indicated at 10. The device includes a male component 20 and a female component 22 that are made of a suitable material, typically metal, which is resistant to corrosion. The device 10 is pressure balanced so that fluid flowing through the device 10 exerts substantially the same force on the male component 20 and the female component 22. Therefore, the fluid flowing through the device 10 does not tend to cause the components 20, 22 to separate. The male component 20 has a fluid flow portion 24 and a support portion 26. Similarly, the female component 22 has a fluid flow portion 28 and a support portion 30. The support portions 26, 30, counterbalance any radial forces that act on respective flow portions 24, 28.

The flow portion 24 of the male component 20 includes a smooth bore 32 that extends from an end 34 of the male component 20 to a middle portion 36 of the male component 20. The middle portion 36 of the male component 20 includes a plurality of smooth bores 38 that extend from the bore 32 through an outside surface 40 of the middle portion 36. Similarly, the female component 22 includes a smooth bore 42 that extends between ends 44, 45 of the female component 22. The female component 22 also includes a middle portion 46 with an internally threaded bore 48 that extends from the bore 42 through an outside surface 50 of the middle portion 46. The male component 20 and the female component 22 are preferably treated in a salt-bath nitriding process with a salt bath temperature of at least about 900° F. to enhance corrosion and wear resistance of the components 20, 22. One example of a suitable salt-bath nitriding process is the Melonite® process that is available Kolene Corporation of Detroit, Mich.

Figure 2:
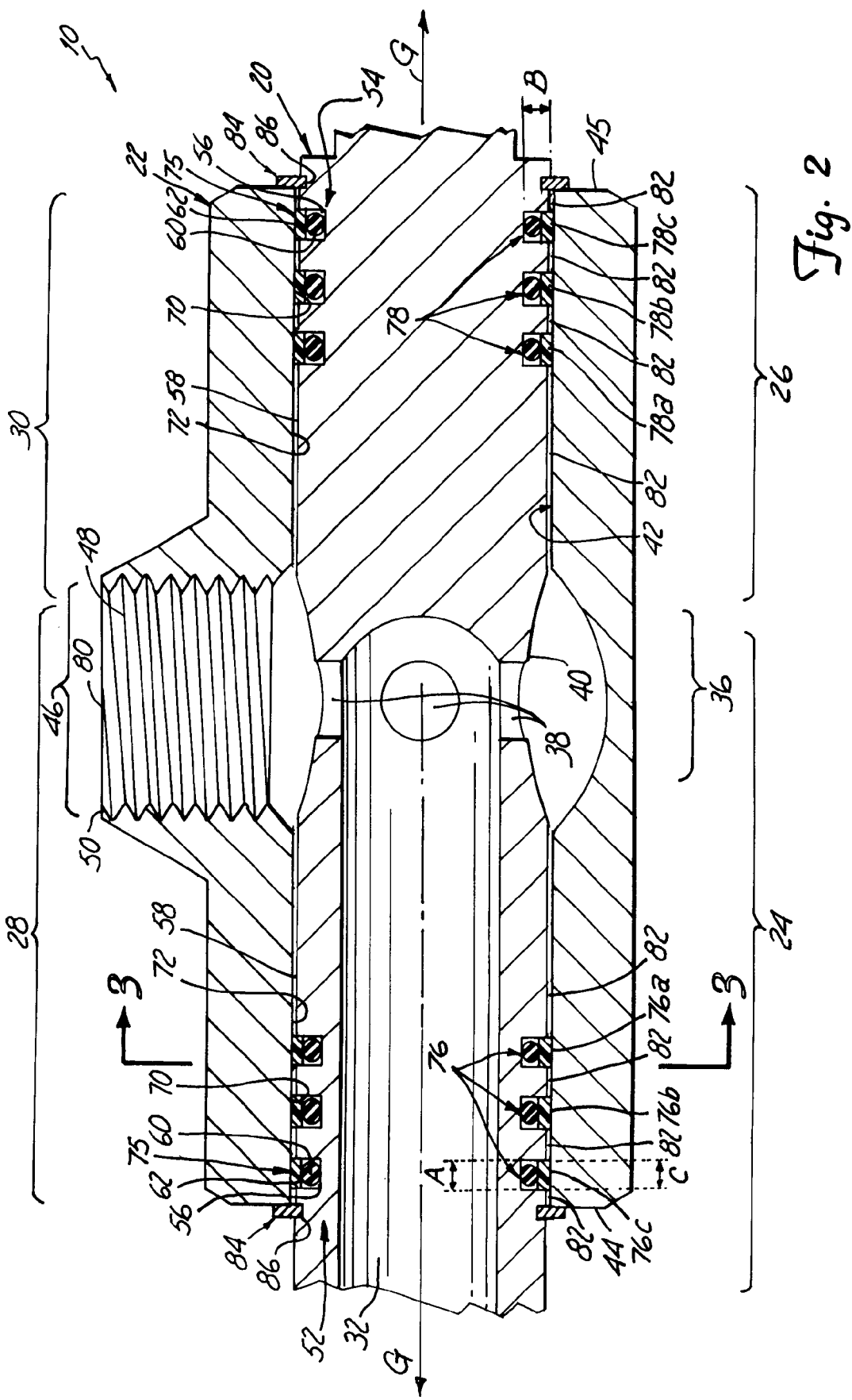
FIG. 2 is cross sectional view of the device of the present invention.

The fluid flow portion 24 of the male component 22 includes a seal structure 52, and the support portion 26 of the male component 22 includes a seal structure 54. The seal structure 52 and the seal structure 54 each include one or more radial recesses or grooves 56 that are formed in an outer radial surface 58 of the male component 20 about a longitudinal axis G of the male component 20. The radial recesses 56 of the seal structure 52 are spaced parallel and adjacent to each other along the flow portion 24 of the male component 20 and the radial recesses 56 of the seal structure 54 are spaced parallel and adjacent to each other along the support portion 26 of the male component 20. The seal structure 52 and the seal structure 54 each also include one or more backing rings, such as o-rings 60, that are individually positioned in each of the radial recesses 56, as best depicted in FIG. 2. Additionally, the seal structures 52, 54 each include one or more flat rings 62 that are individually positioned over each of the o-rings 60 within the recesses 56.

The radial recesses 56 may have any cross sectional shape, but are preferably rectangular in cross section, as depicted in FIG. 2. In one embodiment of the device 10, a width A of each recess 56 is about $90/1000$ of an inch and a depth B of each recess 56 is about $90/1000$ of an inch. Each o-ring 60 is preferably made of a fluoro-elastomer, such as Viton®, which is available from E. I. duPont de Nemours & Co. ("duPont") of Wilmington, Del. Other preferred materials for the o-ring 60 include a polytetrafluoroethylene encapsulated fluoro-elastomer, such as Teflon® encapsulated Viton®, or a glass-based material, such as Aflas®. Teflon® encapsulated Viton® is available from duPont, and Aflas® is available from Asahi Glass America, Inc. of New York, N.Y. When the width A of the recess 56 is about $90/1000$ of an inch and the depth B of the recess 56 is about $90/1000$ of an inch, the o-ring 60 may be a size 17 o-ring.

The flat ring 62 may be made of any relatively hard, wear-resistant material, including, but not limited to, brass; ultrahigh molecular weight polyethylene; polyethylene terephthalate; nylon; or an acetal resin, such as Delrin® resin that is available from dupont. The flat rings 62 may have a width C of about $85/1000$ of an inch, and a thickness D of about $36/1000$ of an inch, when the width A of the recess 56 is about $90/1000$ of an inch, the depth B of the recess 56 is about $90/1000$ of an inch, and the o-ring 60 is a size 17 o-ring. Each of the flat rings 62 are preferably rectangular in cross section.

Referring back to FIG. 1, any or all of the flat rings 62 may include either a cross-sectional cut 64 or a notch (not shown). Alternatively, any or all of the flat rings 62 may exclude the cut 64 and the notch. When any of the flat rings 62 include the cut 64, the cut 64 may form any angle with respect to a line 65 drawn parallel to a longitudinal axis E of the flat ring 62 and drawn through an end 66 of the cut 64. However, a line 67 drawn along the cut 64 preferably makes an angle F of about 45° with respect to the line 65. Each flat ring 62 that includes the cut 64 has cut ends 68a, 68b that face each other at the cut 64. The notch is formed in an outer annular surface 70 of any flat ring 62 that includes the notch. The notch may be formed by partially cutting through the flat ring 62, starting at the surface 70. Similar to the cut 64, the notch may form any angle with respect to the line 65.

After the o-rings 60 are placed in respective radial recesses 56, one of the flat rings 62 is individually placed over the o-ring 60 in each of the radial recesses 56. The flat rings 62 that include the cuts 64 may be easily slipped into position over the o-rings 60 by spreading the ends 68a, 68b. The ends 68a, 68b are released after the rings 62 are positioned over the o-rings 60 in the recesses 56. The flat rings 62 that do not include the cuts 64 may be slipped over the male component 20 and into position over respective o-rings 60 after heating the rings 62 to permit expansion. The material that is used in the flat rings 62 that are heated should be selected so that the flat rings 62 return to their original shape and size upon cooling. Cuts 64 or notches that are included in adjacent flat rings 62 permit the seal structures 52, 54 that incorporate the rings 62 with the cuts or notches to function as labyrinth seals.

Figure 3:
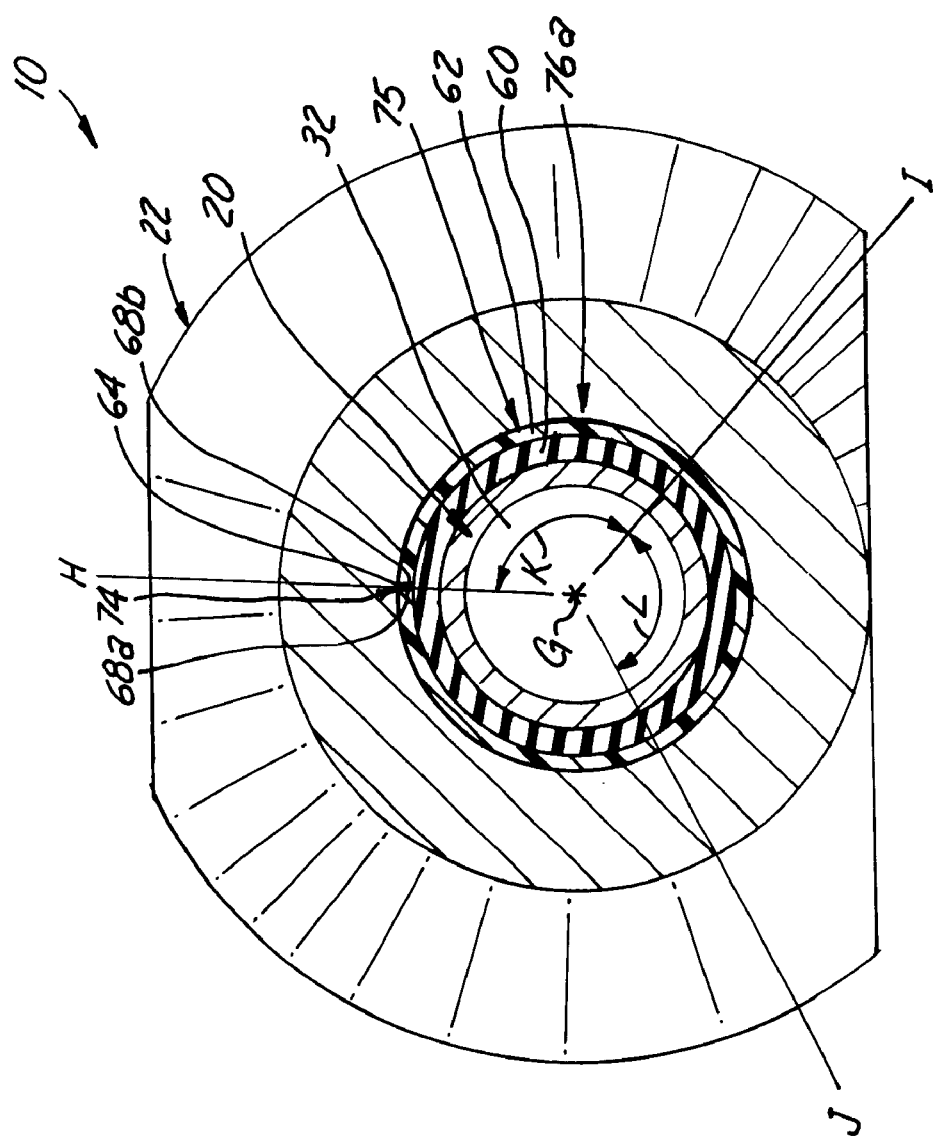
FIG. 3 is a cross sectional view of the device of the present invention taken along line 3—3 of FIG. 2.

The male component 20 may be inserted into the bore 42 of the female component 22, as depicted in FIG. 2, after the rings 62, 64 are mounted in each of the radial recesses 56 of the male component 20. The rings 60, 62 are positioned within each respective recess 56 to ensure that the outer annular surface 70 of each flat ring 62 is in full, intimate contact with an annular surface 72 of the bore 42, when the male component 20 is positioned within the female component 22. The full, intimate contact is believed sufficient to prevent any fluid from seeping through the various interfaces of the outer annular surfaces 70 of the rings 62 and the annular surface 72. To accomplish this full, intimate contact between the surfaces 70, 72, each of the o-rings 60 are compressed by the respective flat rings 62 within the recesses 56 when the male component 20 is positioned within the female component 22. In the compressed state, the o-rings 60 force the outer annular surface 70 of each flat ring 62 into intimate, but movable, sealing contact with the annular surface 72 of the bore 42. Additionally, when the male component 20 is inserted within the female component 22, the cut end 68*a* of each flat ring 62 that includes the cut 64 is forced into light contact with the cut end 68*b* of the flat ring 62 to define a potential path 74, as best depicted in FIG. 3, that fluid flowing through the device 10 may weep through under certain conditions.

When the male component 20 is positioned within the female component 22, the male component 20 and the female component 22 share the longitudinal axis G. Each flat ring 62 that includes the cut 64 is subsequently referred to as a split ring 75. Referring back to FIG. 2, each split ring 75 and o-ring 60 that are associated within an individual one of the recesses 56 in the flow portion 24 forms a two-part seal 76, such as a first two part seal 76*a*, a second part seal 76*b*, and a third two part seal 76*c*, of the seal structure 52. Similarly, each split ring 75 and o-ring 60 that are associated within an individual one of the recesses 56 in the support portion 26 forms a two part seal 78, such as a first two part seal 78*a*, a second two part seal 78*b*, and a third two part seal 78*c*, of the seal structure 54. All subsequent comments about the seal 76 and the first, second, and third two-part seals 76*a*–*c* apply equally to the seal 78 and the first, second, and third two-part seals 78*a*–*c*, unless otherwise stated.

As stated, the bore 48 is internally threaded. Additionally, referring back to FIG. 1, a connection portion 79 of the male component 20 that remains outside of the female portion 22 may be externally threaded. The male component 20 and the female component 22 may thus be threadably attached to fluid flow lines (not shown). Returning to FIG. 2, fluid (not shown) may enter the bore 32 of the male component 20 at the end 34 and exit the bore 48 of the female component 22 at an end 80 of the bore 48 after flowing through the bore 32 of the male component 20, through any of the bores 38 of the male component 20, and through the bore 48 of the female component 22. Alternatively, fluid may flow into the bore 48 at the end 80 and exit the bore 32 at the end 34 after flowing through the bore 48 of the female component 22, through any of the bores 38 of the male component 20, and through the bore 32 of the male component 20.

The split rings 75 of the seals 76, 78 support the male component 20 within the bore 42 of the female component 22 and eliminate or substantially minimize any actual contact between the outer radial surface 58 of the male component 20 and the annular surface 72 of the bore 42. The separation provided by the split rings 75 thus defines a small annular cavity 82 between the outer radial surface 58 of the male component 20 and the annular surface 72 of the bore 42. The small annular cavity 82 and the split rings 75 substantially minimize or eliminate formation of any frictional force between the surface 58 and the surface 70 and facilitate relative rotational movement between the male component 20 and the female component 22.

Though the fluid forces within the device 10 are balanced, other effects, such as gravity, or contact of the component 20 and/or the component 22 with other objects, may cause the male component 20 to move slightly with respect to the female component 22 along the axis G. Therefore, clip rings 84 may be positioned in radial grooves 86 that are located in the outer radial surface 58 of the male component 20 to prevent the male component 20 from shifting along the axis G with respect to the female component 22.

When fluid flows through the bores 32, 38, and 48, the fluid may, depending on the fluid and the conditions of the fluid, flow into the portion of the annular cavity 82 that is located between the first two part seal 76*a* and the first two part seal 78*a*. Fluid that enters the annular cavity 82 between the first two part seals 76*a*, 78*a* may then weep along the path 74 (not shown in FIG. 2) of the first two part seal 76*a* and enter the portion of the annular cavity 82 that is located between the first two part seal 76*a* and the second two part seal 76*b*. Fluid that enters the portion of the annular cavity 82 located between the seals 76*a*, 76*b*, may then weep along the path 74 (not shown in FIG. 2) of the seal 76*b* and enter the portion of the annular cavity 82 located between the seals 76*b*, 76*c*.

The rate at which the fluid weeps through the path 74 of the seal 76*a* is minimized by pressure drop the fluid experiences when flowing through the portion of the annular cavity 82 located prior to the seal 76*a* and when flowing through the path 74 of the seal 76*a*. As previously mentioned, the cut ends 68*a*, 68*b* of each split ring 75 are in light contact with each other. The paths 74 through each of the seals 76 are believed to be created by rough surface portions (not shown) of each of the ends 68*a*, 68*b*. The rate, if any, at which the fluid weeps through the path 74 of the second part seal 76*b* is significantly lower than the rate at which the fluid weeps through the path 74 of the first two part seal 76*a* because of additional pressure drop the fluid experiences when flowing through the annular cavity 82 between the first and second two part seals 76*a*, 76*b*, and through the path 74 of the second two part seal 76*b*.

Fluid that reaches the annular cavity 82 between the second two part seal 76*b* and the third two part seal 76*c* may weep at a very low or negligible rate, such as on the order of about a couple of drops per hour, or may not weep at all, through the path 74 (not shown in FIG. 2) of the third two part seal 76*c*, depending upon the fluid and the conditions of the fluid. The rate, if any, at which the fluid weeps through the path 74 of the third two part seal 76*c* is significantly decreased, as compared to the rate at which any fluid weeps through the path 74 of the second two part seal 76*b*, due to additional pressure drop the fluid experiences in flowing through the annular cavity 82 between the second and third two part seals 76*b*, 76*c* and through the path 74 of the third two part seal 76*c*.

Additionally, referring to FIG. 3, it has been found that the rates at which the fluid flows through the path 74 of the second two part seal 76*b* (not shown in FIG. 3) and through the path 74 of the third two part seal 76*c* (not shown in FIG. 3) may be diminished by off-setting the paths 74 of the seals 76*a*, 76*b* relative to each other and by off-setting the paths 74 of the seals 76*b*, 76*c* relative to each other, about the longitudinal axis G that extends through the male component 20. This off-setting of the paths 74 of the seals 76*a*, 76*b*, 76*c* reduces the weep rate through the paths 74 of the seals 76*b*, 76*c* by increasing the distance the fluid travels within the annular cavity 82 when going from the path 74 of the seal 76*a* to the path 74 of the seal 76*b* and when going from the path 74 of the seal 76*b* to the path 74 of the seal 76*c*. This increase in the distance the fluid travels increases the pressure drop imparted to the fluid in going from path 74 of the seal 76*a*, to the path 74 of the seal 76*b*, and to the path 74 of the seal 76*c*.

In one arrangement of the seals 76, the path 74 of the first seal 76*a* is aligned with a radial H extending outward from the longitudinal axis G. Additionally, the path 74 of the second two part seal 76*b* is aligned with a radial I extending outward from the longitudinal axis G. Finally, the path 74 of the third two part seal 76*c* is aligned with a radial J that extends outward from the longitudinal axis G. With this arrangement, the path 74 of the second two part seal 76b is radially off-set from the path 74 of the first two part seal 76a by an angle K of about 120°, and the path 74 of the third two part seal 76c is radially off-set from the path 74 of the second two part seal 76b by an angle L of about 120°.

In another arrangement of the seals 76, the decrease in weep rate between the path 74 of the seal 76a and the path 74 of the seal 76b may be maximized by increasing the off-set angle K to 180°. Similarly, the decrease in weep rate between the path 74 of the seal 76b and the path 74 of the seal 76c may be maximized by increasing the angle L to 180°. With the angles K, L set at 180°, the radials H, J, I are parallel to each other, the radials H, J extend away from the axis G in the same direction, and the radial I extends away from the longitudinal axis G in a direction that is opposite to that at which the radials H, J extend from the axis G. In another alternative, the paths 74 through the seals 76a, 76b, 76c may be aligned with each other to minimize the impact of the travel distance through the annular cavity 82 upon the rate of fluid weep through the paths 74 of the seals 76b, 76c.

Though the device 10 is depicted with three of the seals 76, as in FIG. 2, the technique of offsetting adjacent paths 74 (not shown in FIG. 2) may be applied to control weep through the paths 74 of the seals 76 whenever two or more of the seals 76 are included. Furthermore, the weep path offsetting technique for controlling the rate of fluid weep may be applied when the flat rings 62 of the seals 76 include notches, instead of the cuts 64, by offsetting the notches of adjacent rings 62 about the G axis.

As mentioned with respect to FIG. 1, the cut 64 of each flat ring 62 may form any angle with respect to the line 65 through the end 66 of the cut 64. When the line 67 drawn along the cut 64 is parallel to the G axis and extends along the line 65, the length of the path 74 (not shown in FIG. 1) along the cut 64 is minimized so that pressure drop and flow rate reduction along the path 74 are minimized. Thus, in environments where it is not necessary to minimize the rate at which fluid weeps through the paths 74, the angle F may be as small as 0°.

As the angle F that is defined by the lines 65, 67 increases above 0°, the length of the path 74 increases and the weep rate across the path 74 decreases, when the fluid and the fluid conditions remain constant. As the angle F increases above about 45°, there is a significantly greater chance that tips 88 of the split rings 75 proximate the cut ends 68a, 68b may break off and inhibit flow rate control along the path 74. For this reason, when it is desired to minimize the rate at which fluid weeps across the paths 74 of the split rings 75, the preferred size of angle F is approximately 45°. Furthermore, it is envisioned that in some applications of the device 10, it may be desirable to vary the angle F for the paths 74 of adjacent rings 76.

Though the seal structure 52 is depicted with first, second, and third two part seals 76a, 76b, 76c, the seal structures 52, 54 may include any number of the two part seals 76. For example, the seal structures 52, 54 could include one, two, three, four, five, or more of the two part seals 76. As a general rule, the amount of fluid that weeps through the paths 74 of the seals 76 that are located closest to respective ends 44, 45 of the female component 22 decreases as more of the two part seals 76 are included in the seal structures 52, 54. The design of the individual two part seals 76 also affects the rate at which fluid weeps from the paths 74 of the seals 76 located closest to the ends 44, 45. Some design features of the seals 76 that may affect the fluid weep rate from the seal structures 52, 54 include the size of each radial recess 56, o-ring 60, and split ring 75; the size of the angle F between the lines 65, 67; the spacing between adjacent seals 76; the spacing between the surface 58 and the surface 72; and the amount of off-set between the paths 74 of adjacent seals 76.

The characteristics and the condition of the fluid flowing through the device 10 also affects the rate at which fluid weeps from the seal structures 52, 54. Some characteristics and conditions of the fluid that may affect the fluid weep rate from the seal structures 52, 54 include, but are not limited to, the temperature, pressure, viscosity, surface tension, and solids content of the fluid. For example, as the temperature, pressure, viscosity, surface tension, and solids content of the fluid increases, it would often be expected that the fluid weep rate from the seal structures 52, 54 would also decrease. Also, as the temperature of the fluid decreases, it would often be expected that the fluid weep rate through the seal structures 52, 54 would decrease.

In some environments in which the device 10 is used, it would be entirely acceptable for the fluid to weep from the seal structure 52 at some rate that is relatively low, compared to the rate at which the fluid flows through the device 10. For example, in a car wash type of environment, some fluid weep through the seal structure 52 is permissible because car washes are typically wet environments where weeping fluids are capable of being recaptured by existing drainage and recovery systems. In fact, it has been discovered that some relatively low rate of fluid weep through the path 74 of each of the seals 76 beneficially extends the life of the split rings 75. Indeed, it has been found that the low rate of fluid weep flushes contaminants that build up in the seal structure 52 through the paths 74 and out of the seal structure 52. One example of a fluid contaminant is particulate matter that is contained in the fluid.

In environments where some rate of fluid weep from the structure 52 is acceptable, the seal structure 52 is preferably designed to permit a rate of fluid weep through each of the paths 74 that is adequate to flush contaminants through the paths 74 and out of the seal structure 52. Indeed, when the rate of fluid weep through the paths 74 is adequate to prevent fluid contaminant buildup within the seal structure 52, it has been found that the components of the seal structure 52, including the o-rings 60 and the split rings 75, are able to run virtually forever without any need to repair or replace the seal components.

In other environments where fluid weep through the seal structure 52 is not desirable or is not permissible, it has been found that the seal structure 52 may sometimes be designed with as few as two of the seals 76, depending upon the characteristics and the conditions of the fluid, to entirely eliminate any fluid weep through the seal structure 52. More typically, it has been found that three of the seals 76 are usually needed to entirely eliminate fluid weep through the seal structure 52, except in rare combinations of fluid characteristics and conditions. Of course, if the fluid characteristics and conditions so dictate, the seal structure 52 may be modified to include whatever number of the seals 76 that are required to eliminate fluid weep through the seal structure 52.

As an alternative to increasing the number of seals 76 to eliminate fluid weep, the seal structure 52 may be modified to incorporate one or more of the flat rings 62 that do not include any cuts 64 or notches. However, the flat rings 62 that do include the cuts 64 or the notches are preferred in applications where some fluid weep is permissible, since it has been found that the fluid weep desirably prevents contaminant buildup in the structure 52. As another alternative to increasing the number of seals 76 to eliminate fluid weep, the seal structure 52 may be designed to substantially or predominately eliminate fluid weep through the seal structure 52, and an o-ring seal (not shown) may be added in a seal ring recess (not shown) that is formed in the male component 20 or the female component 22. When the o-ring seal is included, the o-ring seal should be positioned between the seal structure 52 and the end 44 of the female component 22 so that the o-ring seal is in sealing contact with the male component 20 and the female component 22 to block the flow of any fluid that weeps from the seal structure 52.

The decision between increasing the number of seals 76, versus adding the o-ring seal, to eliminate all fluid weep is usually an economic decision based on a comparison of the cost of adding additional seals 76 sufficient to prevent fluid weep versus the cost of adding, and periodically replacing, the o-ring seal to prevent fluid weep. As previously mentioned, any o-ring seal that is added, instead of additional seals 76, to prevent fluid weep will periodically require replacement downtime and expense since such o-rings typically are unable to operate for more than a few days or weeks, depending upon the application.

In the device 10, the seal structures 52 serve an additional purpose beyond reducing or eliminating fluid weep from the device 10. Specifically, the flat rings 62 of the seal structure 52 function as a bearing that supports the male component 20 in spaced relation away from the radial surface 72 of the bore 42. Additionally, the flat rings 62 minimize frictional forces that inhibit relative rotation between the male component 20 and the female component 22.

As already stated, the retaining clips 84 are adequate to maintain the male component 20 within the female component 22, since the device 10 depicted in FIG. 2 is a pressure balanced device. Nonetheless, if desired, one could add a conventional bearing mechanism, such as ball bearings (not shown) that are positioned within a bearing race (not shown) formed in the male component 20 and the female component 22. In such an application, the bearing mechanism should be positioned between the end 44 of the female component 22 and the seal 76 that is located closest to the end 44 of the female component 22. This positioning of the bearing mechanism would permit the seal structure 52 to protect the bearing mechanism from contact with the fluid when the seal structure 52 is designed to fully prevent fluid weep or when the o-ring seal is included.

When the bearing mechanism is included, the seal structure 52 should be designed so that the seals 76, in combination with any o-ring seal that is included, are adequate to prevent fluid weep from the seal structure 52. Elimination of fluid weep from the seal structure 52, or inclusion of the o-ring seal to catch any fluid weeping from the structure 52, is necessary when the bearing mechanism is included in the device 10, since fluid with the bearing mechanism may flush lubricant from the bearing mechanism and, depending upon the lubricating capacity and any corrosive nature of the fluid, may degrade performance of the bearing mechanism. Despite the option of incorporating the bearing mechanism in the device 10, it is preferred that the device 10 excludes the bearing mechanism and utilizes the seal structure 52 for reducing frictional resistance and the clip rings 84 for retaining the male component 20 within the female component 22, since it has been found that the seal structure 52 is capable of adequately supporting the male component 20 within the female component 22 while reducing frictional resistance and running virtually forever.

Figure 4:
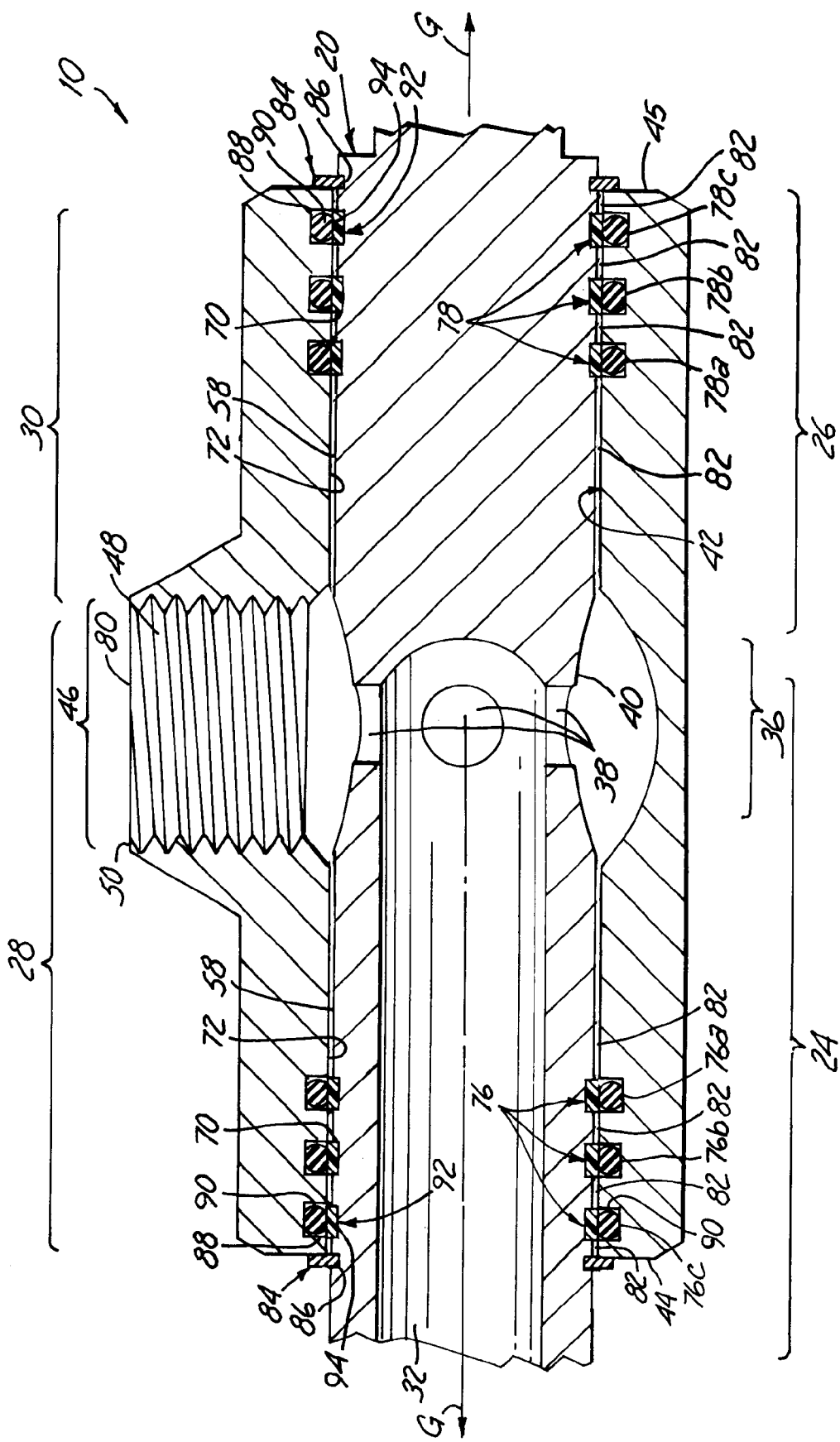
FIG. 4 is a cross sectional view of another embodiment of the device of the present invention.

Though the seals 76 are depicted in FIG. 2 as being included as part of the male component 20, some or all of the seals 76 of the seal structure 52 may instead be incorporated as part of the female component 22, as depicted in FIG. 4. In order to incorporate any of the seals 76 in the female component 22, a radial recess 88 is first formed in the annular surface 72 of the bore 42. Then, an o-ring 90 similar to, but larger in circumference than, the o-ring 60, is positioned within the radial recess 88 formed within the female component 22. Next, a flat ring 92, such as a split ring 94 that is similar to, but larger in circumference than, the split ring 75, is positioned over the o-ring 90 within the radial recess 88 of the female component 22. The split ring 94 preferably supports the male component 20 within the female component 22 without permitting contact between the outer radial surface 58 of the male component 20 and the annular surface 72 of the bore 42.

The radial recesses 88 that are depicted in FIG. 4 are equivalent to the radial recesses 56 that are depicted in FIG. 2, with the exception that the radial recesses 88 are formed in the annular surface 72 of the female component 22, rather than in the outer radial surface 58 of the male component 20 that the recesses 56 are formed in. Therefore, the details previously provided for the recesses 56 are the same for the recesses 88, with the exception that the diameter of the recesses 88 is larger than the diameter of the recesses 56, for a particular device 10. Similarly, the o-rings 90 that are depicted in FIG. 4 are equivalent to the o-rings 60 that are depicted in FIG. 2, with the exception that the o-rings 90 are positioned within the recesses 88, rather than within the recesses 56, and therefore have a greater circumference than the o-rings 60, while retaining the same cross-sectional diameter as the o-rings 60. Additionally, the flat rings 92, such as the split rings 94, that are depicted in FIG. 4 are equivalent to the flat rings 62, such as the split rings 75, that are depicted in FIG. 2, with the exception that the flat rings 92 are positioned within the recesses 88 and in contact with the outer radial surface 58 of the male component 20, rather than being positioned within the recesses 56 and in contact with the annular surface 72 of the female component 22, as are flat rings 62. Thus, the flat rings 92 have a larger circumference than the flat rings 62, though the cross-sectional dimensions of the flat rings 92 and the cross-sectional dimensions of the flat rings 62 are the same.

Those skilled in the art will readily recognize that the positions of the o-rings 90 and the flat rings 92 relative to the axis G are switched, as depicted in FIG. 4, relative to the position of the o-rings 60 and flat rings 62 with respect to the axis G, since the flat rings 92 overlay the o-rings 90 within the recesses 88, similar to the flat rings 62 that overlay the o-rings 60 within the recesses 56. Due to these similarities between the recesses 56 and the recesses 88, between the o-rings 60 and the o-rings 90, and between the flat rings 62 and the flat rings 92, the seals 76, the first two part seal 76a, the second two part seal 76b, and the third part seal 76c, as well as the corresponding seals 78, 78a, 78b, and 78c, are identified by the same reference number when the seals 76, 76a, 76b, 76c, 78, 78a, 78b, and 78c are based within the recess 56 of FIG. 2 and when the seals 76, 76a, 76b, 76c, 78, 78a, 78b, and 78c are based within the recess 88 of FIG. 4.

Despite this ability to incorporate some or all of the seals 76 into the female component 22, instead of the male component 20, it is usually preferred to incorporate all of the seals 76 as part of the male component 20, as depicted in FIG. 2. There are several reasons for incorporating the seals 76 in the male component 20, rather than in the female component 22. For example, it is usually less expensive and less troublesome to form the recesses 56 in the male component 20, as compared to forming the recesses 88 in the female component 22. Additionally, it is somewhat less complicated to position the o-ring 60 and the flat ring 62 in the recess 56 as compared to positioning the o-ring 90 and flat ring 92 within the recess 88 that is formed in the female component 22. Furthermore, it is somewhat less complicated to insert the male component 20 within the female component 22 while holding the o-ring 60 and the flat ring 62 in place within the radial recess 56, as compared to holding the o-ring 90 and the flat ring 92 in the recess 88 of the female component 22 while inserting the male component 20 within the female component 22. Nonetheless, despite these challenges, some or all of the seals 76 may be incorporated in the female component 22, rather than in the male component 20.

Figure 5:
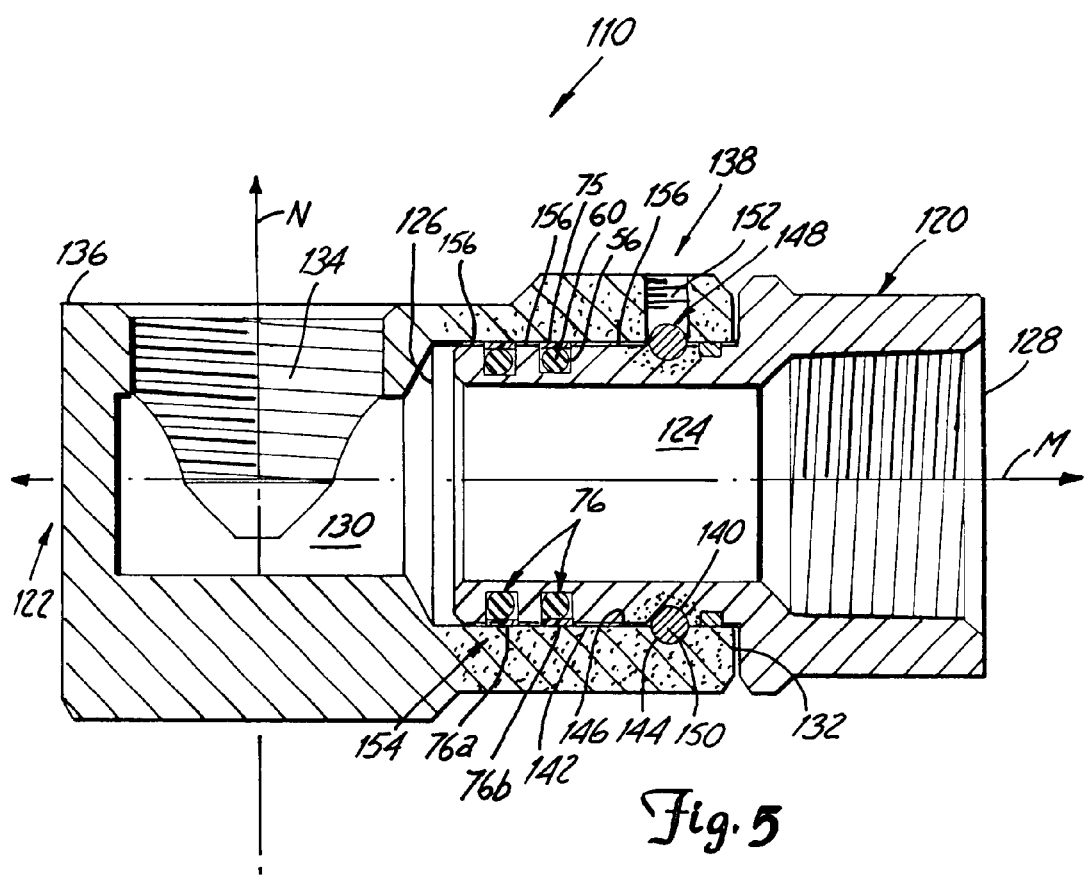
FIG. 5 is a cross sectional view of another embodiment of the device of the present invention.

The device 10 of the present invention may alternatively be formed as an unbalanced hydraulic swivel 110, as depicted in FIG. 5. The swivel 110 includes a male component 120 and a female component 122 that rotatively accepts the male component 120. The male component 120 includes a bore 124 that extends between ends 126, 128 of the male component 120, along a longitudinal axis M. The female component 122 includes a bore 130 that extends from an end 132 of the female component 122 into the female component 122 along the longitudinal axis M. The female component 122 also includes a bore 134 that extends from a radial surface 136 of the female component 22 and into the female component 132 along a radial axis N. The bore 134 extends far enough into the female component 122 to fully intercept the bore 130 and place the bore 134 in fluid communication with the bore 124 of the male component 120. The bore 124 and the bore 134 may each be internally threaded to permit the male component 120 and the female component 122 to be threadably attached to fluid flow lines (not shown).

The swivel 110 includes a bearing mechanism, such as a ball bearing structure 138. To form the ball bearing structure 138, a first bearing race portion 140 is formed in an outer annular surface 142 of the male portion 120 and a second bearing race portion 144 is formed in a radial surface 146 of the bore 130. The first bearing race portion 140 and the second bearing race portion 144 are disposed on the male and female components 120, 122, respectively, such that the first bearing race portion 140 and the second bearing race portion 144 match up in mirror image fashion when the male portion 120 is inserted within the bore 130 of the female component 122.

Together, the first bearing race portion 140 and the second bearing race portion 144 define a ball bearing race 148 into which a plurality of ball bearings 150 may be rollingly inserted. The female component 122 also includes a ball bearing loading bore 152 that extends from the outer radial surface 136 of the female component 122 through the second bearing race portion 144. A retaining bolt (not shown) or a grease zerk (not shown) may be fitted into the ball bearing loading bore 152 to retain the ball bearings 150 within the ball bearing race 148.

The ball bearings 150 serve at least two roles in the swivel 110. First, the ball bearings 150 prevent the formation of excessive friction between the outer annular surface 142 and the radial surface 146. The ball bearings 150 thus permit rotation of the male component 120 and the female component 122 with respect to one another. The ball bearings 150 thereby also allow the fluid flow lines that are connected to the male and female components 120, 122 to rotate with respect to one another.

Also, as already noted, the swivel 110 of the present invention is an unbalanced swivel. An unbalanced swivel is a swivel in which fluid flowing through the swivel components places greater force upon downstream swivel components than upon upstream swivel components. Therefore, in another important role, the ball bearings 150 prevent the male component 120 and the female component 122 from separating due to the unbalanced fluid forces. Specifically, the ball bearings 150 prevent the male component 120 and the female component 122 from shifting relative to each other along the axis M.

The swivel 110 also includes a seal structure 154 that incorporates one or more of the two part seals 76, such as the first two part seal 76a and the second two part seal 76b. Similar to the function of the seals 76 in the device 10 of FIG. 1, the seals 76 that are incorporated in the device 110 help to maintain separation between the outer radial surface 142 of the male component 120 and the radial surface 146 of the bore 130 to define a small annular cavity 156 between the surfaces 142, 146. As in the device 10, the seals 76 also reduce frictional forces generated by rotation of the male component 120 and the female component 122 relative to each other.

Additionally, the seal structure 154 is designed to incorporate a sufficient number of the seals 76 to prevent fluid that flows through the bores 124, 130, and 134 from passing through the annular space 156 and into contact with the ball bearing structure 138. In addition to choosing an adequate number of the seals 76, the design specifications for the seals 76, such as the sizes of the radial recesses 56, the o-rings 60, and the flat rings 62; the angle F (not shown in FIG. 5) of any cut 64 or notch of the flat ring 60; the spacing between adjacent seals 76; and the amount of any radial off-set between any adjacent paths 74 (not shown in FIG. 5) of adjacent seals 76, are selected, considering the characteristics and conditions of the fluid flowing through the swivel 110, to eliminate any fluid weep past the seal 76 that is located closest to the ball bearing structure 138. This elimination of fluid weep past the seal 76 located closest to the bearing structure 138 is necessary since any fluid that weeps past the seal 76 may flush lubricant out of the bearing structure 138 and, depending upon the corrosive and lubricating nature of the fluid, may otherwise degrade the structure or the friction reducing properties of the ball bearing structure 138.

Though the seals 76 are depicted in FIG. 5 as being incorporated only in the male component 120, it is to be understood that some or all of seals 76 may be alternatively incorporated in the female component 122 proximate the radial surface 146 of the bore 130. However, as previously explained with respect to the device 10, all seals 76 of the swivel 110 are preferably incorporated in the male component 120. Also, flat rings 62 with notches instead of cuts 64, or flat rings 62 without notches or cuts 64, may be substituted in place of any of the split rings 75, though the split rings 75 are preferred.

The device 10 and the device 110 of the present invention are particularly suited for rotatably connecting two or more fluid flow lines. The multi-component seal structures 52, 54 that are incorporated in the device 10 of the present invention and the multi-component seal structure 154 that is incorporated in the device 110 of the present invention permit extended operation of the devices 10, 110, even when the fluid flowing through the devices 10, 110 is corrosive and/or has low lubricating capacity. The seals 76 of the seal structures 52, 54, 154 may be structured to make the devices 10, 110 suitable for use in a variety of working environments. Surprisingly, the multi-component structure of the seals 76 allow the formation of seal structures 52, 54, 154 that prevent fluid weep without incorporating o-ring seals in addition to the seals 76.

Although the present invention has been described with reference to preferred embodiments, workers skilled in the art will recognize that changes may be made in form and detail without departing from the spirit and scope of the invention.

What is claimed is:

1. A method of making a device for rotatably connecting fluid flow lines to allow fluid to flow between the fluid flow lines, the method comprising:

placing a first ring member in working relation with a male component or in working relation with a female component, the male component capable of accepting a fluid flow line, the female component capable of accepting another fluid flow line, and the female component capable of accepting at least part of the male component;

placing a second ring member over the first ring member or placing the first ring member over the second ring member, the first ring member comprising a notched ring and the second ring member comprising a backing ring or the first ring member comprising a backing ring and the second ring member comprising a notched ring;

inserting the male component into the female component, the first ring member in contact with a first outer radial surface of the male component and the second ring member in contact with a first inner radial surface of the female component, or the first ring member in contact with the first inner radial surface of the female component and the second ring member in contact with the first outer radial surface of the male component; and retaining at least part of the male component within the female component.

2. The method of claim 1 wherein the first ring member comprises an o-ring or the second ring member comprises a flat ring or wherein the first ring member comprises an o-ring and the second ring member comprises a flat ring.

3. The method of claim 1 wherein the first ring member and the second ring member engage each other.

4. The method of claim 1 wherein the first ring member is in slidable contact with the first outer radial surface of the male component or the second ring member is in slidable contact with the first inner radial surface of the female component.

5. The method of claim 1 wherein the first ring member is in slidable contact with the first outer radial surface of the male component and the second ring member is in slidable contact with the first inner radial surface of the female component.

6. The method of claim 1 wherein the first ring member is in slidable contact with the first inner radial surface of the female component or the second ring member is in slidable contact with the first outer radial surface of the male component.

7. The method of claim 1 wherein the first ring member is in slidable contact with the first inner radial surface of the female component and the second ring member is in slidable contact with the first outer radial surface of the male component.

8. The method of claim 1 wherein the first inner radial surface of the female component defines at least part of a radial recess within the female component.

9. The method of claim 1 wherein the first outer radial surface of the male component defines at least part of a radial recess within the male component.

10. The method of claim 1 wherein the female component further comprises a second inner radial surface, the second inner radial surface defining a cavity within the female component, the method further comprising retaining at least part of the male component within the cavity of the female component.

11. A method of making a device for rotatably connecting fluid flow lines, the method comprising:

placing a ring member in working relation with a male component, the male component capable of accepting a fluid flow line and the ring member comprising a notched ring;

placing a backing ring over the ring member, the backing ring engaging the ring member;

inserting the male component into the female component, the female component capable of accepting another fluid flow line, and the female component capable of accepting at least part of the male component, wherein:

the ring member is in contact with an outer radial surface of the male component and the backing ring is in contact with an inner radial surface of the female component, or the ring member is in contact with the inner radial surface of the female component and the backing ring is in contact with the outer radial surface of the male component; and retaining at least part of the male component within the female component.

12. The method of claim 11 wherein:

the ring member is in slidable contact with the outer radial surface of the male component and the backing ring is in contact with the inner radial surface of the female component, the ring member is in contact with the outer radial surface of the male component and the backing ring is in slidable contact with the inner radial surface of the female component, or the ring member is in slidable contact with the outer radial surface of the male component and the backing ring is in slidable contact with the inner radial surface of the female component.

13. A device for rotatably connecting a first fluid flow line and a second fluid flow line, the device comprising:

a female component that is capable of being placed in fluid connection with the first fluid flow line;

a male component that is capable of being place in fluid connection with the second fluid flow line, at least part of the male component disposed within the female component for relative rotational movement between the male component and the female component;

a mechanism that retains the male component at least partially within the female component;

a first ring member in working relation with the male component or in working relation with the female component;

a second ring member positioned over the first ring member or the first ring member positioned over the second ring member; wherein:

the first ring member comprises a notched ring and the second ring member comprises a backing ring or the first ring member comprises a backing ring and the second ring member comprises a notched ring; and wherein:

the first ring member is in contact with a first outer radial surface of the male component and the second ring member is in contact with a first inner radial surface of the female component or the first ring member is in contact with the first inner radial surface of the female component and the second ring member is in contact with the first outer radial surface of the male component.

14. The device of claim 13 wherein the first ring member comprises an o-ring or the second ring member comprises a flat ring or wherein the first ring member comprises an o-ring and the second ring member comprises a flat ring.

15. The device of claim 13 wherein the first ring member and the second ring member engage each other.

16. The device of claim 13 wherein the first ring member is in slidable contact with the first outer radial surface of the male component or the second ring member is in slidable contact with the first inner radial surface of the female component.

17. The device of claim 13 wherein the first ring member is in slidable contact with the first outer radial surface of the male component and the second ring member is in slidable contact with the first inner radial surface of the female component.

18. The device of claim 13 wherein the first ring member is in slidable contact with the first inner radial surface of the female component or the second ring member is in slidable contact with the first outer radial surface of the male component.

19. The device of claim 13 wherein the first ring member is in slidable contact with the first inner radial surface of the female component and the second ring member is in slidable contact with the first outer radial surface of the male component.

20. The device of claim 13 wherein the female component further comprises a second inner radial surface, the second inner radial surface defining a cavity within the female component, at least part of the male component retained within the cavity of the female component.

21. A device for rotatably connecting a first fluid flow line and a second fluid flow line, the device comprising:
 a female component that is capable of being placed in fluid connection with the first fluid flow line;
 a male component that is capable of being place in fluid connection with the second fluid flow line, at least part of the male component disposed within the female component for relative rotational movement between the male component and the female component;
 a mechanism that retains the male component at least partially within the female component;
 a ring member;
 a backing ring, the ring member comprising a notched ring; and
 wherein:
  the ring member is in contact with an outer radial surface of the male component and the backing ring is in contact with an inner radial surface of the female component or the backing ring is in contact with the outer radial surface of the male component and the ring member is in contact with the inner radial surface of the female component.

22. The device of claim 21 wherein:
 the ring member is in slidable contact with the outer radial surface of the male component and the backing ring is in contact with the inner radial surface of the female component,
 the ring member is in contact with the outer radial surface of the male component and the backing ring is in slidable contact with the inner radial surface of the female component, or
 the ring member is in slidable contact with the outer radial surface of the male component and the backing ring is in sidable contact with the inner radial surface of the female component.

23. A method of making a device for rotatably connecting fluid flow lines to allow fluid to flow between the fluid flow lines, the method comprising:
 placing a first ring member in working relation with a male component or in working relation with a female component, the male component capable of accepting a fluid flow line, the female component capable of accepting another fluid flow line, and the female component capable of accepting at least part of the male component;
 placing a second ring member over the first ring member or placing the first ring member over the second ring member wherein:
  the first ring member comprises a split ring having a pair of facing ends and the second ring member comprises a backing ring or
  the first ring member comprises a backing ring and the second ring member comprises a split ring having a pair of facing ends
 inserting the male component into the female component,
  the first ring member in contact with a first outer radial surface of the male component and the second ring member in contact with a first inner radial surface of the female component, or
  the first ring member in contact with the first inner radial surface of the female component and the second ring member in contact with the first outer radial surface of the male component; and
 retaining at least part of the male component within the female component.

24. The method of claim 23 wherein the first outer radial surface of the male component faces the first inner radial surface of the female component.

25. The method of claim 24 wherein:
 the male component has a first longitudinal axis, the first outer radial surface of the male component facing away from the first longitudinal axis and
 the female component has a second longitudinal axis, the first inner radial surface of the female component facing toward the second longitudinal axis.

26. The method of claim 23 wherein the pair of facing ends define a path, the fluid capable of weeping along and through the path.

27. A method of making a device for rotatably connecting fluid flow lines to allow fluid to flow between the fluid flow lines, the method comprising:
 placing a first ring member in working relation with a male component or in working relation with a female component, the male component capable of accepting a fluid flow line, the female component capable of accepting another fluid flow line, and the female component capable of accepting at least part of the male component;
 placing a second ring member over the first ring member or placing the first ring member over the second ring member;
 notching the second ring member or cutting through a cross-section of the second ring member;
 inserting the male component into the female component, the first ring member in contact with a first outer radial surface of the male component and the second ring member in contact with a first inner radial surface of the female component, or the first ring member in contact with the first inner radial surface of the female component and the second ring member in contact with the first outer radial surface of the male component; and retaining at least part of the male component within the female component.

28. The method of claim 27 wherein notching the second ring member or cutting through a cross-section of the second ring member creates a path, the fluid capable of weeping along and through the path.

29. The method of claim 28 wherein the first outer radial surface of the male component faces the first inner radial surface of the female component.

30. The method of claim 29 wherein:

the male component has a first longitudinal axis, the first outer radial surface of the male component facing away from the first longitudinal axis and the female component has a second longitudinal axis, the first inner radial surface of the female component facing toward the second longitudinal axis.

31. A method of making a device for rotatably connecting fluid flow lines to allow fluid to flow between the fluid flow lines, the method comprising:

placing a first ring member in working relation with a male component or in working relation with a female component, the male component capable of accepting a fluid flow line, the female component capable of accepting another fluid flow line, and the female component capable of accepting at least part of the male component;

placing a second ring member over the first ring member or placing the first ring member over the second ring member;

inserting the male component into the female component, the first ring member in slidable contact with a first outer radial surface of the male component and the second ring member in slidable contact with a first inner radial surface of the female component, or the first ring member in slidable contact with the first inner radial surface of the female component and the second ring member in slidable contact with the first outer radial surface of the male component; and retaining at least part of the male component within the female component.

32. The method of claim 31 wherein the first outer radial surface of the male component faces the first inner radial surface of the female component.

33. The method of claim 32 wherein:

the male component has a first longitudinal axis, the first outer radial surface of the male component facing away from the first longitudinal axis and the female component has a second longitudinal axis, the first inner radial surface of the female component facing toward the second longitudinal axis.

34. A method of making a device for rotatably connecting fluid flow lines, the method comprising:

placing a ring member in working relation with a male component, the male component capable of accepting a fluid flow line and the ring member comprising a split ring;

placing a backing ring over the ring member, the backing ring engaging the ring member; and inserting the male component into the female component, the ring member in contact with an outer radial surface of the male component, the backing ring in contact with an inner radial surface of the female component, the female component capable of accepting another fluid flow line, and the female component capable of accepting at least part of the male component; and retaining at least part of the male component within the female component.

35. The method of claim 34 wherein the first outer radial surface of the male component faces the first inner radial surface of the female component.

36. The method of claim 34 wherein:

the male component has a first longitudinal axis, the first outer radial surface of the male component facing away from the first longitudinal axis and the female component has a second longitudinal axis, the first inner radial surface of the female component facing toward the second longitudinal axis.

37. The method of claim 36 wherein the ring member comprises a split ring or a notched ring.

38. The method of claim 37 wherein the first outer radial surface of the male component faces the first inner radial surface of the female component.

39. The method of claim 38 wherein:

the male component has a first longitudinal axis, the first outer radial surface of the male component facing away from the first longitudinal axis and the female component has a second longitudinal axis, the first inner radial surface of the female component facing toward the second longitudinal axis.

40. A method of making a device for rotatably connecting fluid flow lines, the method comprising:

placing a ring member in working relation with a male component, the male component capable of accepting a fluid flow line;

placing a backing ring over the ring member, the backing ring engaging the ring member; and inserting the male component into the female component, the ring member in slidable contact with an outer radial surface of the male component, the backing ring in slidable contact with an inner radial surface of the female component, the female component capable of accepting another fluid flow line, and the female component capable of accepting at least part of the male component; and retaining at least part of the male component within the female component.

41. A method of making a device for rotatably connecting fluid flow lines, the method comprising:

placing a backing ring in working relation with a male component, the male component capable of accepting a fluid flow line;

placing a ring member over the backing ring, the ring member engaging the backing ring and the ring member comprising a split ring;

inserting the male component into the female component, the ring member in contact with an inner radial surface of the female component, the backing ring in contact with an outer radial surface of the male component, the female component capable of accepting another fluid flow line, and the female component capable of accepting at least part of the male component; and retaining at least part of the male component within the female component.

42. The method of claim 41 wherein the first outer radial surface of the male component faces the first inner radial surface of the female component.

43. The method of claim 42 wherein:
the male component has a first longitudinal axis, the first outer radial surface of the male component facing away from the first longitudinal axis and
the female component has a second longitudinal axis, the first inner radial surface of the female component facing toward the second longitudinal axis.

44. A method of making a device for rotatably connecting fluid flow lines, the method comprising:
placing a backing ring in working relation with a male component, the male component capable of accepting a fluid flow line;
placing a ring member over the backing ring, the ring member engaging the backing ring;
inserting the male component into the female component, the ring member in slidable contact with an inner radial surface of the female component, the backing ring in slidable contact with an outer radial surface of the male component, the female component capable of accepting another fluid flow line, and the female component capable of accepting at least part of the male component; and
retaining at least part of the male component within the female component.

45. The method of claim 44 wherein the first outer radial surface of the male component faces the first inner radial surface of the female component.

46. The method of claim wherein:
the male component has a first longitudinal axis, the first outer radial surface of the male component facing away from the first longitudinal axis and the female component has a second longitudinal axis, the first inner radial surface of the female component facing toward the second longitudinal axis.

47. A device for rotatably connecting a first fluid flow line and a second fluid flow line, the device comprising:
a female component that is capable of being placed in fluid connection with the first fluid flow line;
a male component that is capable of being place in fluid connection with the second fluid flow line, at least part of the male component disposed within the female component for relative rotational movement between the male component and the female component;
a mechanism that retains the male component at least partially within the female component;
a first ring member in working relation with the male component or in working relation with the female component;
a second ring member positioned over the first ring member the first ring member positioned over the second ring member;
wherein:
the first ring member comprises a split ring having a pair of facing ends or
the second ring member comprises a split ring having a pair of facing ends; and
wherein:
the first ring member is in contact with a first outer radial surface of the male component and the second ring member is in contact with a first inner radial surface of the female component or
the first ring member is in contact with the first inner radial surface of the female component and the second ring member is in contact with the first outer radial surface of the male component.

48. The device of claim 47 wherein the pair of facing ends define a path, the fluid capable of weeping along and through the path.

49. The device of claim 48 wherein the first ring member comprises an o-ring or the second ring member comprises a flat ring or wherein the first ring member comprises an o-ring and the second ring member comprises a flat ring.

50. A device for rotatably connecting a first fluid flow line and a second fluid flow line, the device comprising:
a female component that is capable of being placed in fluid connection with the first fluid flow line;
a male component that is capable of being place in fluid connection with the second fluid flow line, at least part of the male component disposed within the female component for relative rotational movement between the male component and the female component;
a mechanism that retains the male component at least partially within the female component;
a first ring member in working relation with the male component or in working relation with the female component;
a second ring member positioned over the first ring member the first ring member positioned over the second ring member and the second ring member comprising a notched ring or a split ring; and
wherein:
the first ring member is in contact with a first outer radial surface of the male component and the second ring member is in contact with a first inner radial surface of the female component or
the first ring member is in contact with the first inner radial surface of the female component and the second ring member is in contact with the first outer radial surface of the male component.

51. The device of claim 50 wherein the first outer radial surface of the male component faces the first inner radial surface of the female component.

52. The device of claim 51 wherein:
the male component has a first longitudinal axis, the first outer radial surface of the male component facing away from the first longitudinal axis and the female component has a second longitudinal axis, the first inner radial surface of the female component facing toward the second longitudinal axis.

53. A device for rotatably connecting a first fluid flow line and a second fluid flow line, the device comprising:
a female component that is capable of being placed in fluid connection with the first fluid flow line;
a male component that is capable of being place in fluid connection with the second fluid flow line, at least part of the male component disposed within the female component for relative rotational movement between the male component and the female component;
a mechanism that retains the male component at least partially within the female component;
a first ring member in working relation with the male component or in working relation with the female component;
a second ring member positioned over the first ring member the first ring member positioned over the second ring member; and
wherein:
the first ring member is in slidable contact with a first outer radial surface of the male component and the second ring member is in slidable contact with a first inner radial surface of the female component or the first ring member is in slidable contact with the first inner radial surface of the female component and the second ring member is in slidable contact with the first outer radial surface of the male component.

54. The device of claim 53 wherein the first outer radial surface of the male component faces the first inner radial surface of the female component.

55. The device of claim 54 wherein:

the male component has a first longitudinal axis, the first outer radial surface of the male component facing away from the first longitudinal axis and the female component has a second longitudinal axis, the first inner radial surface of the female component facing toward the second longitudinal axis.

56. A device for rotatably connecting a first fluid flow line and a second fluid flow line, the device comprising:

a female component that is capable of being placed in fluid connection with the first fluid flow line;

a male component that is capable of being place in fluid connection with the second fluid flow line, at least part of the male component disposed within the female component for relative rotational movement between the male component and the female component;

a mechanism that retains the male component at least partially within the female component;

a ring member in contact with an outer radial surface of the male component, the ring member comprising a split ring; and a backing ring in contact with an inner radial surface of the female component, the backing ring positioned over the ring member and the backing ring engaging the ring member.

57. The device of claim 56 wherein the first outer radial surface of the male component faces the first inner radial surface of the female component.

58. The device of claim 52 wherein:

the male component has a first longitudinal axis, the first outer radial surface of the male component facing away from the first longitudinal axis and the female component has a second longitudinal axis, the first inner radial surface of the female component facing toward the second longitudinal axis.

59. A device for rotatably connecting a first fluid flow line and a second fluid flow line, the device comprising:

a female component that is capable of being placed in fluid connection with the first fluid flow line;

a male component that is capable of being place in fluid connection with the second fluid flow line, at least part of the male component disposed within the female component for relative rotational movement between the male component and the female component;

mechanism that retains the male component at least partially within the female component;

a ring member in slidable contact with an outer radial surface of the male component; and a backing ring in slidable contact with an inner radial surface of the female component, the backing ring positioned over the ring member and the backing ring engaging the ring member.

60. The device of claim 59 wherein the first outer radial surface of the male component faces the first inner radial surface of the female component.

61. The device of claim 60 wherein:

the male component has a first longitudinal axis, the first outer radial surface of the male component facing away from the first longitudinal axis and the female component has a second longitudinal axis, the first inner radial surface of the female component facing toward the second longitudinal axis.

62. A device for rotatably connecting a first fluid flow line and a second fluid flow line, the device comprising:

a female component that is capable of being placed in fluid connection with the first fluid flow line;

a male component that is capable of being place in fluid connection with the second fluid flow line, at least part of the male component disposed within the female component for relative rotational movement between the male component and the female component;

a mechanism that retains the male component at least partially within the female component;

a backing ring in contact with an outer radial surface of the male component; and a ring member in contact with an inner radial surface of the female component, the ring member positioned over the backing ring and the ring member engaging the backing ring, the ring member comprising a split ring.

63. The device of claim 62 wherein the first outer radial surface of the male component faces the first inner radial surface of the female component.

64. The device of claim 63 wherein:

the male component has a first longitudinal axis, the first outer radial surface of the male component facing away from the first longitudinal axis and the female component has a second longitudinal axis, the first inner radial surface of the female component facing toward the second longitudinal axis.

65. A device for rotatably connecting a first fluid flow line and a second fluid flow line, the device comprising:

a female component that is capable of being placed in fluid connection with the first fluid flow line;

a male component that is capable of being place in fluid connection with the second fluid flow line, at least part of the male component disposed within the female component for relative rotational movement between the male component and the female component;

a mechanism that retains the male component at least partially within the female component;

a backing ring in slidable contact with an outer radial surface of the male component;

a ring member in slidable contact with an inner radial surface of the female component, the ring member positioned over the backing ring and the rings member engaging the backing ring.

66. The device of claim 65 wherein the first outer radial surface of the male component faces the first inner radial surface of the female component.

67. The device of claim 65 wherein:

the male component has a first longitudinal axis, the first outer radial surface of the male component facing away from the first longitudinal axis and the female component has a second longitudinal axis, the first inner radial surface of the female component facing toward the second longitudinal axis.

* * * * *

UNITED STATES PATENT AND TRADEMARK OFFICE
CERTIFICATE OF CORRECTION

PATENT NO.    : 6,299,219 B1
DATED         : October 9, 2001
INVENTOR(S)   : Bruce A. Hoegger It is certified that error appears in the above-identified patent and that said Letters Patent is hereby corrected as shown below:

Column 2,
Line 61, after "FIG. 2 is", insert -- a --

Column 16,
Line 3, delete "sidable", insert -- slidable --

Column 21,
Line 52, before "mechanism", insert -- a --.

Column 22,
Line 51, delete "rings", insert -- ring --

Signed and Sealed this

Fourth Day of June, 2002

Attest:

Attesting Officer

JAMES E. ROGAN
Director of the United States Patent and Trademark Office